United States Patent [19]
Uchiumi

[11] Patent Number: 5,270,998
[45] Date of Patent: Dec. 14, 1993

[54] REWRITABLE RECORDING MEDIUM AND RECORDING REPRODUCING APPARATUS FOR USE WITH REWRITABLE RECORDING MEDIUM

[75] Inventor: Satoshi Uchiumi, Tokorozawa, Japan

[73] Assignee: Pioneer Electronic Corporation, Tokyo, Japan

[21] Appl. No.: 781,408

[22] Filed: Oct. 23, 1991

[30] Foreign Application Priority Data

Nov. 6, 1990 [JP] Japan .................. 2-300671
Nov. 6, 1990 [JP] Japan .................. 2-300672

[51] Int. Cl.$^5$ ............................... G11B 3/70
[52] U.S. Cl. .................. 369/277; 369/275.3; 369/275.4; 369/278.1
[58] Field of Search .......... 369/46.26, 275.3, 275.4, 369/277, 275.1, 124, 111, 59, 112, 100, 46.13, 46.11, 46.12

[56] References Cited

U.S. PATENT DOCUMENTS 5,023,856 6/1991 Raaymakers et al. .......... 369/32

FOREIGN PATENT DOCUMENTS 60-247842 12/1985 Japan .................. 369/279
63-32751 2/1988 Japan .................. 369/275.3

Primary Examiner—Tommy P. Chin
Assistant Examiner—Robert Chevalier
Attorney, Agent, or Firm—Fish & Richardson

[57] ABSTRACT

A rewritable recording medium and a recording method wherein a train of clock pulses for PLL synchronization, which is to be inserted in a sync pulse interval consisting of at least one horizontal scan period and different from the vertical blanking period of a video format signal, is subjected to biphase modulation with a time code and is recorded, by the superimposition on the video format signal, on the recording medium. According to the second aspect, in a rewritable recording medium having pregrooves, lands serve as record tracks, and odd track numbers and even track numbers are respectively recorded in odd track number areas and even track number areas in each sector of the pregrooves, so that in writing data or reading data from an odd or even track, a corresponding odd or even track number can be obtained.

5 Claims, 7 Drawing Sheets

REWRITABLE RECORDING MEDIUM AND RECORDING REPRODUCING APPARATUS FOR USE WITH REWRITABLE RECORDING MEDIUM

BACKGROUND OF THE INVENTION

1. Field of the Invention

The present invention relates to a rewritable recording medium (including write-once type) where a digital signal such as PCM audio data to be recorded is inserted in a video format signal (a signal having the same format as a television signal including horizontal and vertical sync signals), a rewritable (also including write-once type) recording medium with pregrooves, and a recording/reproducing apparatus therefor.

2. Description of Background Information

There is a known multiplex recording method, wherein a digital signal such as a PCM audio data is inserted into the vertical blanking period of a video format signal, to be recorded on a rewritable recording disk. This method is suitable for a so-called "post-recording" by which audio data matched with image information carried by a video format signal is recorded after the recording of the image information.

The vertical blanking period of a video format signal however includes an identification (ID) signal having at least time axis information such as a so-called Philips code, so that inserting a digital signal into the vertical blanking period therefore may erase the ID signal.

There is known a rewritable recording medium which has wavy pregrooves to carry track ID information including track numbers.

In order to record information on a target track on such a rewritable recording medium or read out recorded information therefrom, it is necessary to identify its track number. In the conventional rewritable recording mediums, the same track number is recorded in the same pregroove, and information to be rewritten is recorded in the pregrooves.

Because the flatness at the bottom of the pregrooves is not enough, however, information, when recorded in the pregrooves, would have noise thereon, resulting in low C/N of the reproduced information signal.

As a solution to this shortcoming, information to be recorded may be recorded not on the pregrooves, but on lands having better flatness, each located between two adjacent pregrooves, to improve C/N.

In recording information on a land, however, the track numbers are identified from pregrooves on both sides of the land, so that two different track numbers may be read out at a time, raising a new problem.

SUMMARY OF THE INVENTION

It is therefore a primary object of the present invention to provide a rewritable recording medium which can still hold time axis information of a video format signal even when a digital signal is recorded in a multiplexed form in the vertical blanking period of the video format signal.

It is another object of this invention to provide a rewritable recording medium which has pregrooves that carry track ID information including track numbers and permits the correct track number to be identified even when information is recorded on lands of the recording medium, and a recording/reproducing apparatus using the same.

According to one aspect of the present invention, in a rewritable recording medium and a recording method using the same, a digital signal inserted in a vertical blanking period of a video format signal, the video format signal includes a train of clock pulses for synchronization in a sync pulse interval formed by at least one horizontal scan period other than the vertical blanking period, and the clock pulse train is modulated with a time axis information signal carrying time axis information of the video format signal.

According to another aspect of the present invention, in a rewritable recording medium having wavy pregrooves for carrying one address identification number for each unit information block and having lands serving as recording tracks, the pregrooves include odd track number areas and even track number areas adjacent thereto, and odd track numbers are inserted in the odd track number areas in the pregrooves sandwiching those lands which become odd numbered tracks and even track numbers are inserted in the even tack number areas in the pregrooves sandwiching those lands which become even numbered tracks.

A recording/reproducing apparatus for a rewritable recording medium according to the present invention comprises an optical system for emitting a read spot on the lands, receiving a reflected beam by means of at least two light-receiving elements located in parallel in a direction crossing tracks, and acquiring two optically converted outputs of the light-receiving elements, and an extraction means for, when the optically converted outputs have the same track number, setting the track number as a present track number.

In the rewritable recording medium and recording method using the same according to the first aspect of the present invention, a digital signal is inserted in the vertical blanking period of a video format signal, and a train of clock pulses for PLL synchronization inserted in a sync pulse interval formed by at least one horizontal scan period other than the vertical blanking period is modulated with a time axis information signal of the video format signal. In recording information on the recording medium or reproducing information therefrom, the clock pulse train acquired from the sync pulse interval is demodulated to yield time axis information of the video format signal.

In the rewritable recording medium and the recording/reproducing apparatus according to the second aspect of the present invention, wavy pregrooves have odd track number areas and even track number areas adjacent thereto, odd track numbers are recorded in the odd track number areas in the pregrooves sandwiching those lands which become odd numbered tracks, and even tack numbers are recorded in the even track number areas in the pregrooves sandwiching those lands which become even number tracks. While a write or read operation is performed on an odd numbered track, the odd track number in the associated odd track number area is retrieved. While such an operation is performed on a even numbered track, the even track number in the associated even track number area is retrieved.

DETAILED DESCRIPTION OF THE PREFERRED EMBODIMENT

A preferred embodiment of the present invention will now be described referring to FIGS. 1 through 9.

Figure 1:
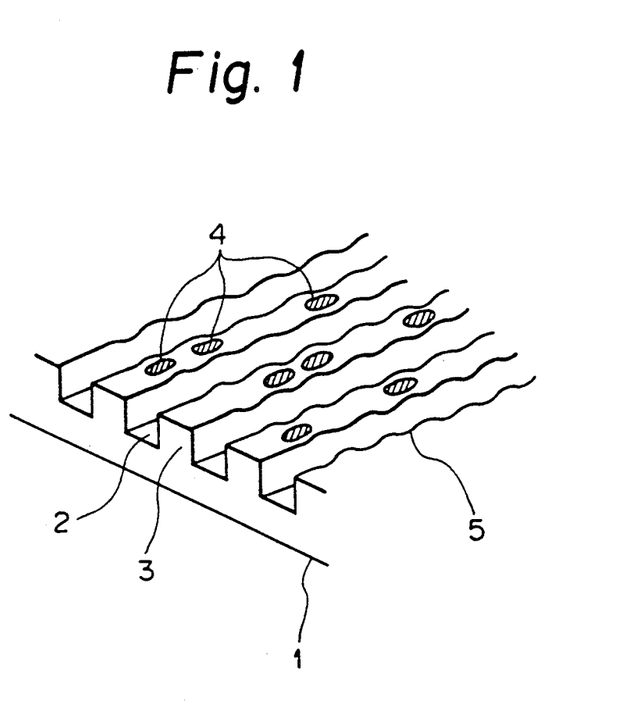
FIG. 1 is an enlarged perspective cross-sectional view of a rewritable optical disk as a rewritable recording medium according to the present invention.

In FIG. 1 pregrooves 2 are formed in the recording surface of a rewritable optical disk 1 as a rewritable recording medium. A laser beam (not shown) is irradiated on a land 3 as a recording track, sandwiched between two adjoining pregrooves 2, to form pits 4 on the land 3, thereby recording an information signal. In the case of a magneto-optic disk, the pits 4 are recorded by inversion of the direction of magnetization.

Each pregroove 2 has its walls 5 waving in the direction perpendicular to the tracks. This wavy shape permits an address ID signal that is a wobble signal of a high frequency to be superimposed on a tracking error signal of a low frequency. This address ID signal is formed in a predetermined format in a unit information signal block called "sector."

Figure 2:
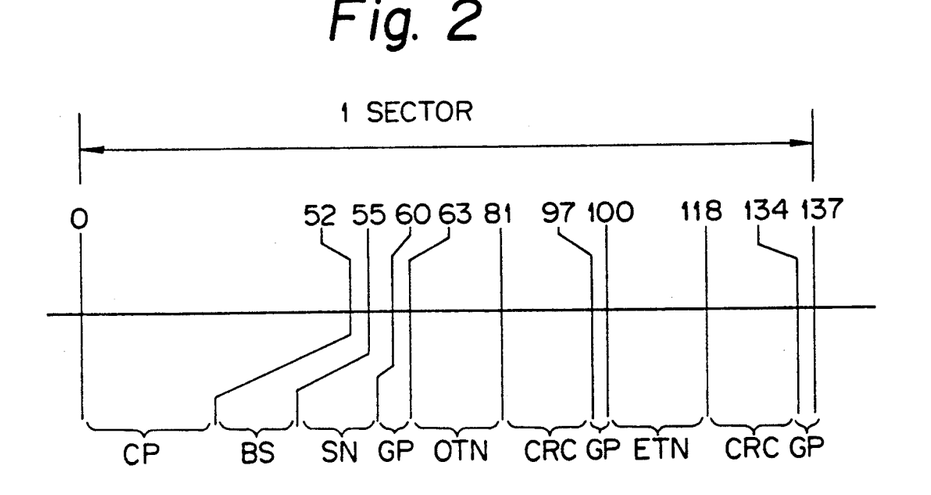
FIG. 2 is a recording format for pregrooves 2 in FIG. 1.

As shown in FIG. 2, one sector consists of 137 bits. One track is divided into 25 sectors to permit a video format signal to be recorded on the disk 1 in both the NTSC system and PAL system.

FIG. 2 illustrates data arrangement format or that one of the 25 sectors which includes a track number. In this format, a clock pulse area CP of 52 bits (6.5 bytes) has a train of clock pulses recorded therein, one clock for one bit, and each clock pulse becomes a PLL signal for a spindle servo when the disk 1 is accessed for information recording or reproduction. Likewise, an area BS has a 3-bit block sync signal recorded therein, while an area SN has a 5-bit sector numbers (0 to 24) recorded therein. Three areas GP, located at 61st to 63rd bits, 98th to 100th bits, and 135th to 137th bits, are gaps where no signal is present or an irregular waveform is present.

An 18-bit area OTN from 64th bit to 81st bit is an odd track number area containing an odd track number. Another 18-bit area ETN from 119th bit to 134th bit is an even track number area carrying an even track number. Two redundancy bit areas CRC each have an error detect code pulse recorded therein.

Figure 3:
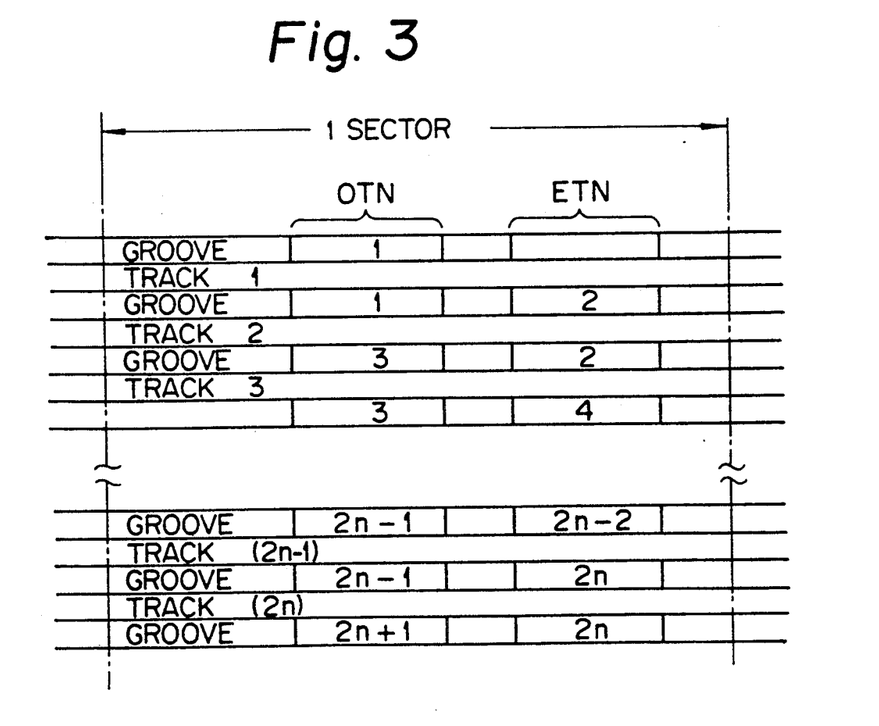
FIG. 3 is an arrangement map having the format in FIG. 2 recorded thereon.

Referring to FIG. 3, a track number "1" is recorded in the areas OTN in the pregrooves on both sides of a track 1. Nothing is recorded in the area ETN in one of the pregrooves, while a track number "2" is recorded in the area ETN in the other pregroove. With regard to a track 2, a track number "1" is recorded in the area OTN in one of the two pregrooves sandwiching the track 2, namely the one adjacent to the track 1, while a track number "3" is recorded in the area OTN in the other pregroove. Further, a track number "2" is recorded in the areas ETN in both pregrooves.

As is apparent from the above, the correct track number for an odd numbered track [2n−1] (n: natural number; this is true in the rest of the description) is recorded in the areas OTN in the pregrooves on both sides of that track, while the correct track number for an even numbered track [2n] is recorded in the areas ETN in the pregrooves on both sides of that track.

Figure 4:
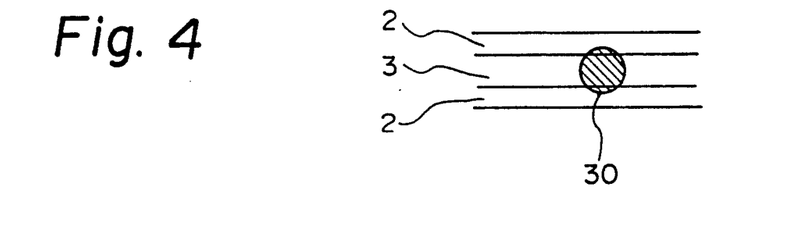
FIG. 4 is a diagram illustrating a light beam irradiated on a land shown in FIG. 1.

Referring to FIG. 4, a spot 30 of a laser beam irradiated on the land 3 is larger than the width of that land. The reflected beam of the spot 30 enters a quadrant-segment light-receiving element 31 in FIG. 5. The total sum of the four outputs of this light-receiving element 31 becomes a read signal in reproduction mode. Two pairs of outputs of the light-receiving element 31 are added, and the resultant two sum signals are supplied to a differential amplifier 32. The output of the differential amplifier 32 is supplied as a tracking error signal to a tracking servo circuit (not shown) and also to a band-pass filter 33.

Figure 5:
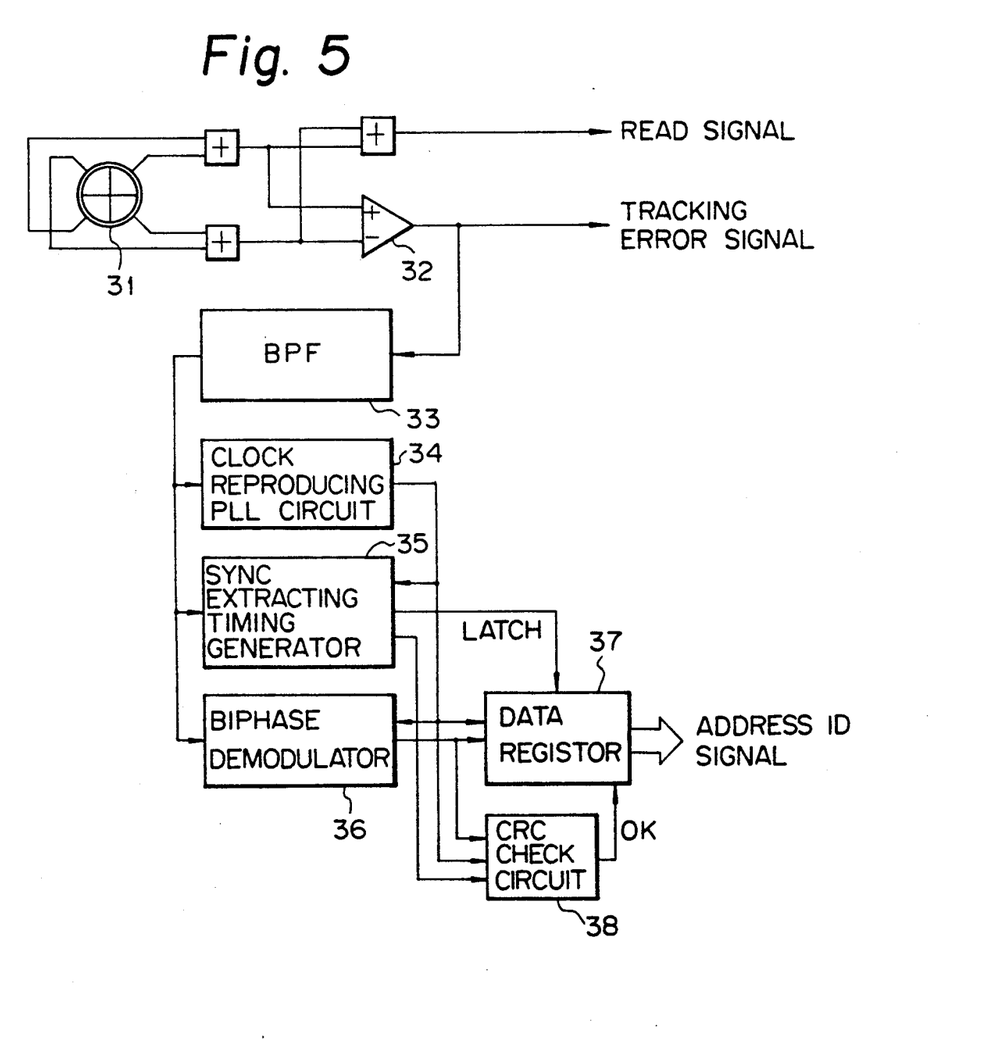
FIG. 5 and 6 are block diagrams illustrating a part of a recording/reproducing apparatus according to the present invention.

The output of the band-pass filter 33 is subjected to wave shaping to provide the wobble signal of a high frequency, or the address ID signal included in the tracking error signal. The address ID signal is supplied to a clock reproducing PLL circuit 34, a sync extracting timing generator 35 and a biphase demodulator 36.

The biphase demodulator 36 outputs the aforementioned sector number and track number which are supplied to a data register 37 and a CRC check circuit 38. Then, code data for error detection following the track number is supplied to the CRC check circuit 38 where it is determined if the track number is correct.

Biphase-modulated signals of track numbers are such that the phases of the carriers of consecutive odd track numbers [2n−1], [2n+1], [2n+3]... and of consecutive even track numbers [2n−2], [2n], [2n+2]... are alternately inverted.

Accordingly, the track numbers [2n−2] and [2n] in the areas ETN on both sides of the odd numbered track (2n −1) in FIG. 3 have the opposite phases, so that the reproduced amplitudes may cancel out to become smaller. This prevents demodulation of the data, and the CRC check circuit 38 will determine the track numbers are in error. Likewise, the track numbers [2n−1] and [2n+1] in the areas OTN for the even numbered track (2n) will also be determined as in error.

For the odd numbered track (2n−1) and the even numbered track (2n), the track numbers [2n−1] and [2n] are judged correct, and are output from the data register 37 as the address ID signals. In other words, even when information is recorded on the lands of a rewritable or write-once read-many type recording medium, the correct track number can be identified.

As description will no be given of the case where a video format signal is to be recorded on the rewritable optical disk 1 having pregrooves carrying the aforementioned track ID signals.

Figure 6:
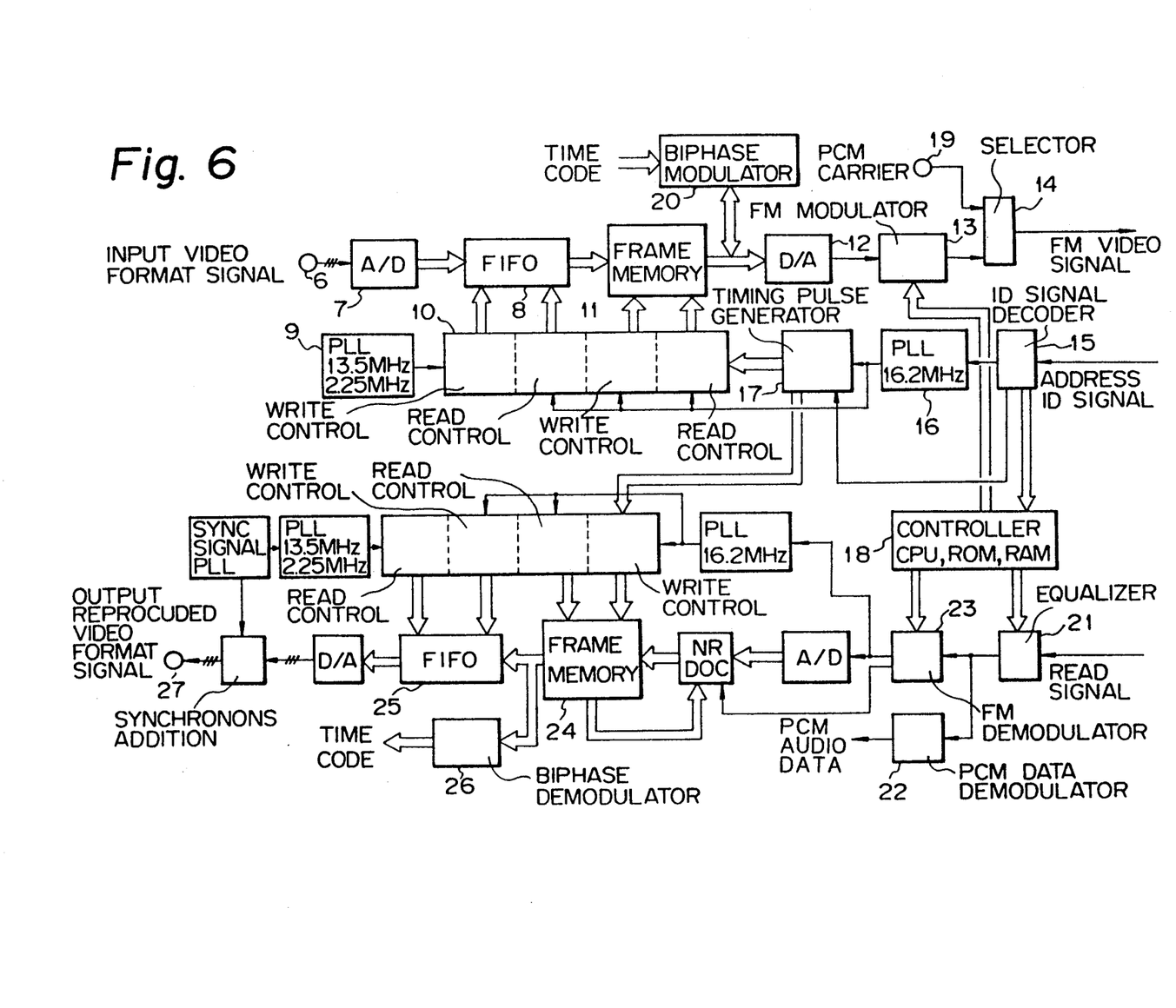

FIG. 6 illustrates a processor which inserts and records a video format signal and a digital signal, such as PCM audio data, for the rewritable optical disk, in the vertical blanking period of the former signal, and reproduces these signals. In the processor, an analog video format signal consisting of a luminance signal Y, color difference signals (R−Y) and (B−Y), and a sync signal is input through an input terminal 6. The input signal is supplied to an A/D converter 7 to be converted into a digital video format signal.

The digital video format signal is written in a FIFO 8 serving as a line memory, and is compressed along the time axis. A clock for writing the luminance signal into the FIFO 8 is 13.5 MHz, and a clock for writing the color difference signals thereinto is 2.25 MHz. These clocks are given to a read/write controller 10 from a PLL clock generator 9. Clocks for reading the luminance signal and color difference signals from the FIFO 8 are both 16.2 MHz.

Accordingly, the luminance signal is compressed in the ratio of 13.5 (MHz)/16.2 (MHz) or 1/1.2, while the color difference signals are compressed in the ratio of 2.25 (MHz)/16.2 (MHz) or 1/7.2. These three compressed video signal are multiplexed along the time axis to become a single multiplexed video signal.

The multiplexed video signal from the FIFO 8 is written in a frame (or field) memory 11 via a digital filter (not shown) to eliminate turnaround noise. In this frame memory 11 the time adjustment (synchronous adjustment) between the input multiplexed video signal and a multiplexed video signal to be recorded on the disk 1 is performed. The multiplexed video signal from the frame memory 11 is read out in accordance with the sync clock of 16.2 MHz in record mode, and is supplied to a D/A converter 12 where it is converted into an analog multiplexed video signal.

Then, the analog multiplexed video signal is modulated in an FM modulator 13, and the resultant signal is supplied to a selector 14 to be an FM video signal. The FM video signal is supplied to a laser diode (not shown) of a disk driving section (not shown) and is recorded as an information signal on a track of the land 3 shown in FIG. 1.

At the time the information signal is recorded as described above, the track ID signal read out from the associated pregroove 2 is supplied to an ID signal decoder 15. Of the track ID signal, a train of clock pulses or a train of sector sync pulses in the area CP in FIG. 2 is supplied from the ID signal decoder 15 to a PLL circuit 16. Consequently, a sync clock of 16.2 MHz in record mode is applied to a timing pulse generator 17 from the circuit 16. In accordance with a timing pulse output from the pulse generator 17, read control to the frame memory 11 is executed.

A controller 18 including a CPU, ROM, RAM and the like controls the above-described sequence of operations in record mode upon reception of the track number, sector number and the like from the ID signal decoder 15.

Meantime, in the vertical blanking period of the FM video signal, the FM modulated signal of PCM audio data supplied through an input terminal 19 is inserted in the FM video signal in the selector 14 and is recorded in that form on the land 3.

Figure 7:
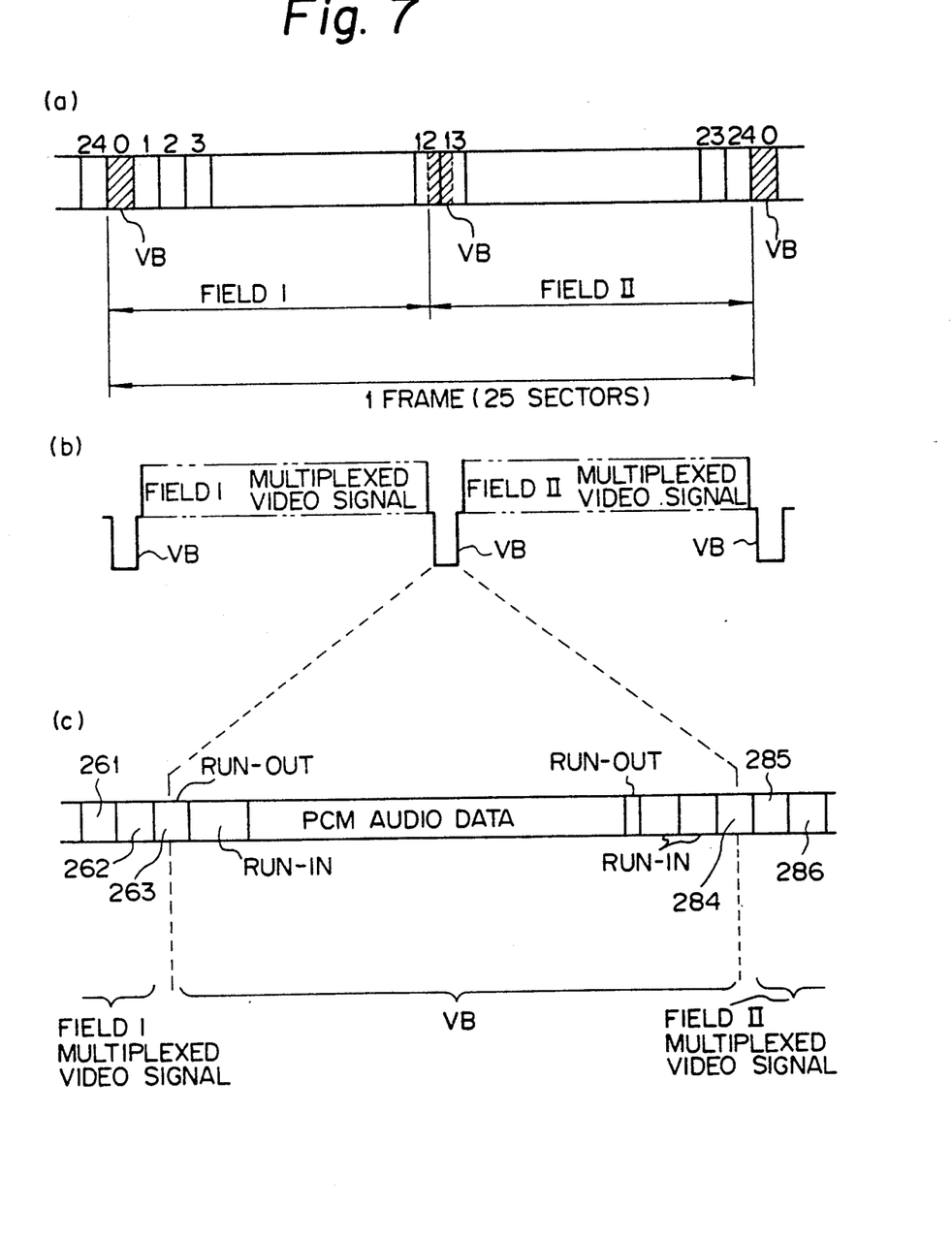
FIG. 7, (a) through (c), and FIG. 9, (a) through (c), show the format of a signal to be recorded on a rewritable recording medium according to the present invention.

In FIG. 7 (a), one frame is divided into 25 sectors, from sector 0 to sector 24, as mentioned earlier. The numbers of horizontal scan lines in the NTSC and PAL systems (hereinafter simply referred to as "lines") are 525 and 625, respectively. With one frame divided into 25 sectors, the number of lines per sector in the NTSC system is 21 and that number in the PAL system is 25, so that a rewritable disk can be commonly used by both systems. Further, the number of clocks per line in the NTSC system is 6.5 clocks, and that number in the PAL system is 5.5 clocks. When the carrier component of the wobble signal leaks in the video signal band, the leak frequencies in both systems respectively become 6.5 times and 5.5 times the line frequency $f_H$, which results in a frequency shift of 0.5 $f_H$, thus reducing the influence of the signal leaking.

In FIG. 7 (a), a field I extends from the sector 0 to the middle of the sector 12, and a field II begins with the middle of the sector 12. The vertical blanking VB of one frame is therefore provided in the sector 0 and in the area between the middle of the sector 12 and the middle of the sector 13. As shown in FIG. 7 (b), the multiplexed video signal is recorded in such a way that its first field is recorded from the sector 1 to the middle of the sector 12 and its second field from the middle of the sector 13 to the sector 24.

In FIG. 7 (c), PCM audio data is inserted and recorded together with a run-in and a run-out, both being sync pulses, in the vertical blanking period VB. As the PCM audio data is recorded occupying the vertical blanking period, a time code which is time information of the multiplexed video signal will be recorded in a sync pulse interval other than the vertical blanking period and consisting of at least 1 H line. A train of clock pulses for PLL synchronization is inserted in the sync pulse interval including at least one line immediately after the vertical blanking period of the video format signal input through the input terminal 6 in FIG. 4. The time code is superimposed on the PCM audio data by subjecting their clock signal to biphase modulation for example with the time code. In other words, a biphase modulator 20 has already received the time code and performs biphase modulation of the clock pulse train of the multiplexed video signal output from the frame memory 11.

Figure 8:
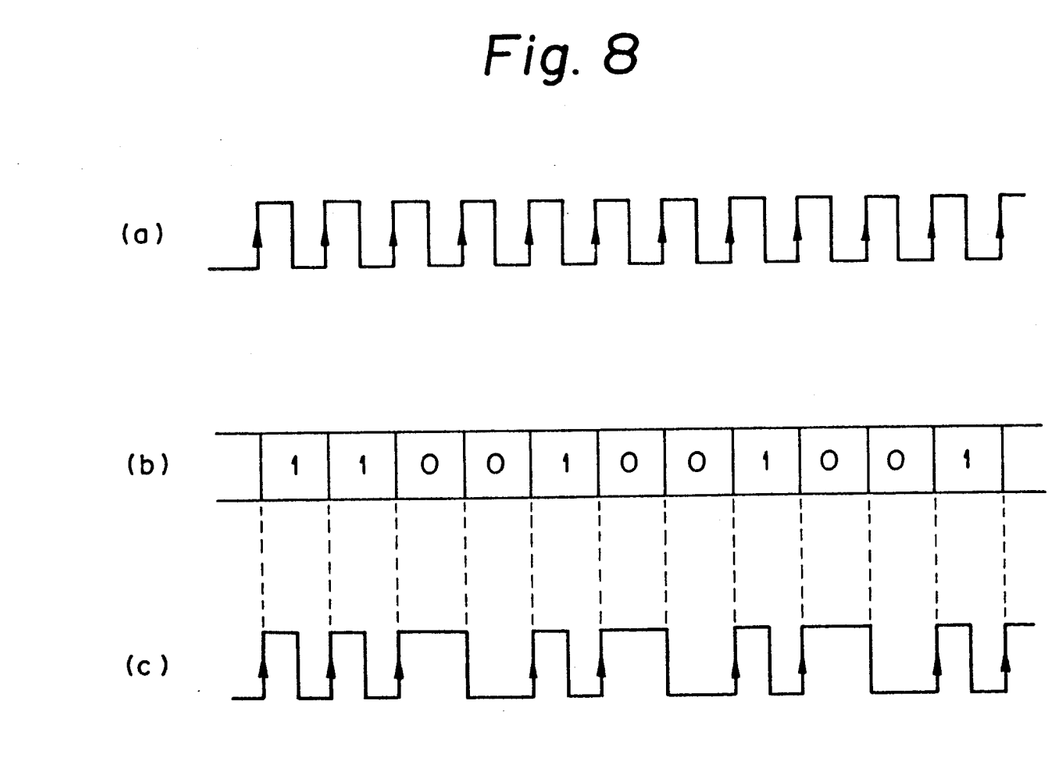
FIG. 8 is a timing chart illustrating the operation of a part of the diagram shown in FIG. 6.

As shown in FIG. 8 (a), when a train of clock pulses has constant inversion intervals, the time code is modulated and will not be superimposed on the PCM audio data. This clock pulse permits PLL synchronization.

A train of clock pulses after biphase modulation with the time code in FIG. 8 (b) which is input to the biphase modulator 20 has its inversion interval changed, based on the values of the time code, "1" and "0", as shown in FIG. 8 (c). The timing or the phase of the edge of the modulated clock pulse train is however in phase with that of the unmodulated clock pulse train.

Superimposition of the time code can therefore be effected while maintaining the function of the PLL synchronization. As the number of "0"s in the time code increases, the number of pulse edges for PLL synchronization decreases. Because of the property of the time code and a large number of clock pulses (bits), however, the PLL synchronization will not be affected.

Figure 9:
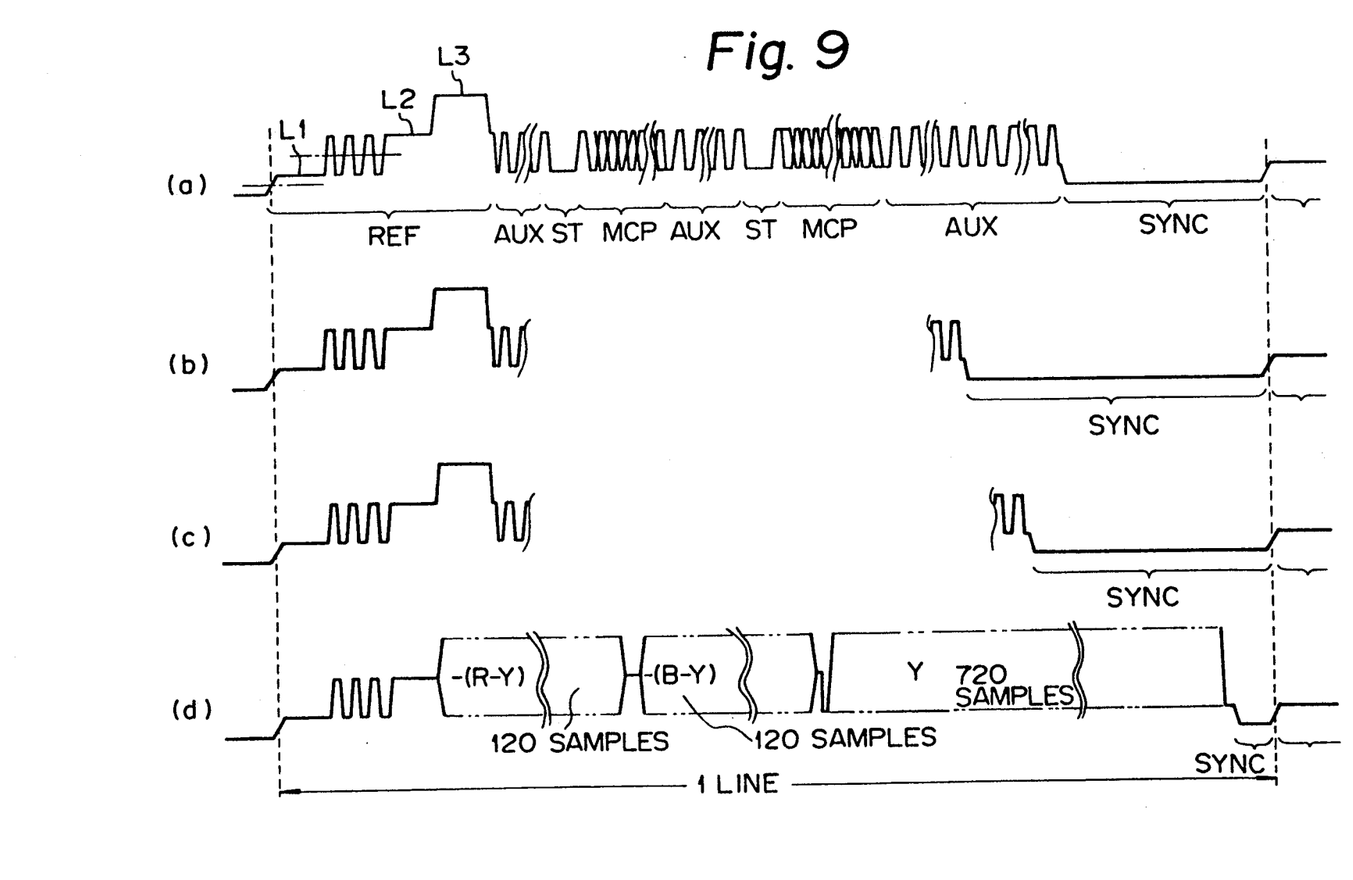

In FIG. 9 (a), a total of 160 bits of the modulated clock pulse train is inserted in one line period in two areas MCP, 80 bits in each area. The same information may be recorded in the two areas for protection from error or different information may be recorded there to be used for different purposes. In an area ST is recorded a start signal for the modulated clock pulse train.

In an area SYNC is inserted a horizontal sync signal. An are REF represents the reference level of the video signal, L1, L2 and L3 respectively represent the pedestal, color reference level and white reference (white peak) level. In three areas AUX are inserted a train of clock pulses for external synchronization.

In FIG. 9 (b) and (c) show the last lines in the vertical blanking period in the fields I and II, and are the same as (a) in FIG. 9 except for different time lengths of the horizontal sync signal and the clock pulse train for external synchronization. The different horizontal sync signals serve to distinguish the field I from the field II.

In FIG. 9 (d), the multiplexed video signal in the effective line comprises 120 data samples for each color difference signal and 720 data samples for the luminance signal.

In reproducing the disk on which the PCM audio data and time code are superimposed on each other, a read signal read out by an optical pickup (not shown) is amplified to have the necessary level, and is supplied to an equalizer 21. PCM data in the read signal from the equalizer 21 is demodulated by a PCM data demodulator 22, and is then put through a PCM reproduction circuit and an audio amplifier (neither shown) so that the original audio signal may be reproduced.

The FM video signal in the read signal, which has the time code superimposed thereon, is supplied to an FM demodulator 23, yielding an analog multiplexed video signal.

This analog multiplexed video signal is written in a frame (or field) memory 24 after undergoing A/D conversion, dropout compensation and the like. The multiplexed video signal having the time axis adjusted in the frame memory 24 is expanded along the time axis, as opposed to the compression done at the recording time, by a FIFO 25, so that the original video format signal may be finally output from an output terminal 27. The details of this processing will be omitted.

The modulated clock pulse train in the multiplexed video signal output from the frame memory 24 is demodulated by a biphase demodulator 26 to provide the original time code.

The track number and the like acquired from the track ID signal during a reading operation are supplied to the controller 18 from the ID signal decoder 15 and are used to control the recording/reproducing apparatus in reproduction mode.

While a train of clock pulses is biphase-modulated with the time code in this embodiment, the present invention is not limited to this particular modulation, but may employ other modulation such as phase modulation.

While a rewritable optical disk is used as recording medium in this embodiment, the present invention may of course be applied to a write-once read-many type optical disk.

As described above, in the rewritable recording medium and recording method using the same according to the first aspect of the present invention, a train of clock pulses for synchronization is modulated with a time axis information signal carrying time axis information of the video signal and recorded in a sync pulse interval containing at least one horizontal scan line and different from the vertical blanking period of the video format signal, whereby the time axis information signal can be maintained even when a digital signal such as PCM audio data is inserted in the vertical blanking period.

In the rewritable recording medium and recording-/reproducing apparatus according to the second aspect of the present invention, with lands serving as record tracks, odd track numbers and even track numbers are respectively recorded in the odd track number areas and even track number areas adjacent to the former areas in the pregrooves, whereby during data writing or data reading on an odd numbered track area or the even track area can be read out to identify the correct track number.

What is claimed is:

1. A rewritable recording medium comprising:
   wavy pregrooves for carrying one address identification number for each unit information block; and
   lands forming recording tracks, wherein said wavy pregrooves include odd track number areas and even track number areas adjacent thereto, odd track numbers are inserted in the odd track number areas in each pair of pregrooves sandwiching those lands forming odd numbered tracks, and even track numbers are inserted in the even track number areas in each pair of pregrooves sandwiching those lands forming even numbered tracks.

2. A rewritable recording medium according to claim 1, wherein said wavy pregrooves include a clock pulse area having a train of clock pulses in addition to the odd and even track number areas.

3. A rewritable recording medium according to claim 1, wherein, in said odd and even track number areas, carrier signals carrying respective track numbers are recorded, said carrier signals of consecutive odd track numbers have alternately opposite phases, and said carrier signals of consecutive even track numbers have alternately opposite phases.

4. A recording/reproducing apparatus for a rewritable recording medium having wavy pregrooves for carrying one address identification number for each unit information block, and lands forming recording tracks, wherein said wavy pregrooves include odd track number areas and even track number areas adjacent thereto, odd track numbers are inserted in the odd track number areas in each pair of pregrooves sandwiching those lands forming odd numbered tracks, and even track numbers are inserted in the even track number areas in each pair of pregrooves sandwiching those lands forming even numbered tracks, said apparatus comprising:
   an optical system including means for emitting a read light spot on said lands, at least two light-receiving elements located in parallel in a direction to cross the tracks for receiving a reflected beam of said read light spot, and deriving two optically converted outputs of the light-receiving elements; and
   an extraction means for extracting track numbers from said optically converted outputs, and setting a track number as a present track number when the track numbers extracted from said optically converted outputs are equal.

5. A recording/reproducing apparatus according to claim 4, wherein the extraction means comprises:
   demodulation means for performing biphase demodulation on said optically converted outputs, and
   error detection means for detecting if the track number acquired from the demodulation means is correct or not and outputting the correct track number.

* * * * *